US012697636B2

(12) United States Patent
Kundem

(10) Patent No.: US 12,697,636 B2
(45) Date of Patent: Aug. 4, 2026

(54) IR/UV SENSOR-BASED SPRAYING SYSTEM

(71) Applicant: Wagner Spray Tech Corporation, Plymouth, MN (US)

(72) Inventor: Jeshwanth Durga Sagar Kundem, Minneapolis, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 491 days.

(21) Appl. No.: 18/172,439

(22) Filed: Feb. 22, 2023

(65) Prior Publication Data

US 2023/0278055 A1 Sep. 7, 2023

Related U.S. Application Data

(60) Provisional application No. 63/315,139, filed on Mar. 1, 2022.

(51) Int. Cl.
*B05B 12/08* (2006.01)
*B05B 13/00* (2006.01)
(Continued)

(52) U.S. Cl.
CPC .......... *B05B 12/084* (2013.01); *B05B 12/082* (2013.01); *B05B 13/005* (2013.01); *B05B 13/0431* (2013.01); *B05B 12/004* (2013.01)

(58) Field of Classification Search
None
See application file for complete search history.

(56) References Cited

U.S. PATENT DOCUMENTS 5,337,926 A 8/1994 Drobish et al.
6,024,174 A 2/2000 Pierce
(Continued)

FOREIGN PATENT DOCUMENTS

DE 10138167 A1 2/2003
EP 1828754 81 7/2013
(Continued)

OTHER PUBLICATIONS

PCT International Search Report and Written Opinion for International Application No. PCT/US2023/062978. dated Jun. 23, 2023, 12 pages.
(Continued)

*Primary Examiner* — Binu Thomas
(74) *Attorney, Agent, or Firm* — Christopher J. Volkmann; KELLY, HOLT & CHRISTENSON PLLC

(57) ABSTRACT

A handheld fluid spraying system includes a pump assembly configured to provide a pressurized liquid and a handheld fluid sprayer. The handheld fluid sprayer comprises a fluid inlet configured to receive the pressurized liquid, a spray tip having an outlet through which the pressurized liquid exits the handheld fluid sprayer to be applied to a surface, a trigger configured to control flow of the liquid through the handheld fluid sprayer, and a sensor configured to detect the liquid and to generate sensor data indicative thereof, the sensor being selected from the group consisting of an infrared (IR) sensor, a thermal imager, and a UV sensor. The handheld fluid spraying system further comprises a controller configured to determine a characteristic of the liquid based on the sensor data and to generate a control output based on the determined characteristic.

20 Claims, 10 Drawing Sheets

(51) Int. Cl.
*B05B 13/04* (2006.01)
*B05B 12/00* (2018.01)

(56) References Cited

U.S. PATENT DOCUMENTS

| | | | |
|---|---|---|---|
| 7,129,492 | B2 | 10/2006 | Saito et al. |
| 7,220,966 | B2 | 5/2007 | Saito et al. |
| 8,875,855 | B2 | 11/2014 | Pettersson et al. |
| 9,061,309 | B2 | 6/2015 | Haas et al. |
| 10,513,856 | B2 | 12/2019 | Telleria et al. |
| 10,526,799 | B2 | 1/2020 | Telleria et al. |
| 10,577,810 | B2 | 3/2020 | Telleria et al. |
| 10,697,188 | B2 | 6/2020 | Telleria et al. |
| 10,718,119 | B2 | 7/2020 | Telleria et al. |
| 10,822,814 | B2 | 11/2020 | Telleria et al. |
| 10,870,996 | B2 | 12/2020 | Telleria et al. |
| 11,173,611 | B2 | 11/2021 | Thompson et al. |
| 11,235,890 | B1 * | 2/2022 | Dahlstrom ............ B05B 13/005 |
| 2010/0132439 | A1 | 6/2010 | Giles |
| 2012/0219699 | A1 * | 8/2012 | Pettersson ............... B05B 13/04 118/669 |
| 2015/0092189 | A1 | 4/2015 | Waters |
| 2018/0281012 | A1 * | 10/2018 | Telleria ............... B05C 11/1039 |
| 2018/0318865 | A1 * | 11/2018 | Harvison ............ B05B 13/0431 |
| 2019/0255551 | A1 | 8/2019 | Hargadon |
| 2019/0366375 | A1 | 12/2019 | Thompson et al. |
| 2020/0032528 | A1 | 1/2020 | Telleria et al. |
| 2020/0087930 | A1 | 3/2020 | Telleria et al. |
| 2020/0149298 | A1 | 5/2020 | Telleria et al. |
| 2020/0269439 | A1 * | 8/2020 | Telleria ................ B25J 11/0075 |
| 2021/0181020 | A1 | 6/2021 | McQuilkin et al. |
| 2023/0372957 | A1 * | 11/2023 | Jose ...................... B05B 13/005 |

FOREIGN PATENT DOCUMENTS

| | | | |
|---|---|---|---|
| JP | 1156650 | A | 6/1989 |
| JP | 2010127778 | A | 6/2010 |
| JP | 4887071 | B2 | 2/2012 |
| JP | 5118611 | B2 | 1/2013 |
| WO | 2012037267 | A1 | 3/2012 |
| WO | 2015033214 | A2 | 3/2015 |
| WO | WO2016089092 | A1 | 6/2016 |
| WO | WO2016156700 | A1 | 10/2016 |
| WO | WO2018136499 | A1 | 7/2018 |
| WO | WO2020108766 | A1 | 6/2020 |
| WO | 2020216382 | A1 | 10/2020 |
| WO | WO2021113606 | A1 | 6/2021 |
| WO | WO2021113609 | A1 | 6/2021 |

OTHER PUBLICATIONS

Omar, M., Viti, V., Saito, K. and Liu, J., 2006. Self-adjusting robotic painting system. Industrial Robot: an International Journal, 33(1), pp. 50-55.

"MosaicCORE" retrieved from <<https://www.thermal.com/mosaic-core.html>>, retrieved on Feb. 16, 2023, 9 pages.

"MicroCORE" retrieved from <<https://www.themal.com/micro-core.html>>, retrieved on Feb. 16, 2023, 6 pages.

"Application Story, Flir Thermal Imaging Cameras Monitor the Quality of Vessel Constructions", Flir Systems, Accessed on Dec. 3, 2021, 2 pages.

"Can Thermal Imaging Cameras See Through These 19 Things?". Jan. 22, 2020, retrieved from <<https://www.infrascan.com.au/blog/can-thermal-imaging-cameras-see-through-these-19-things>>, 28 pages.

International Preliminary Report on Patentability for International Application No. PCT/US2023/062978, dated Sep. 12, 2024, 8 pages.

Extended European Search Report for European Application No. 23764027.1, mailed Oct. 27, 2025, 08 Pages.

Communication Pursuant to Article 94(3) EPC for European Application No. 23764027.1, dated Jun. 2, 2026, 6 Pages.

* cited by examiner

IR/UV SENSOR-BASED SPRAYING SYSTEM

CROSS REFERENCE TO RELATED APPLICATIONS

The present application is based on and claims the benefit of U.S. provisional patent application Ser. No. 63/315,139, filed Mar. 1, 2022, the content of which is hereby incorporated by reference in its entirety.

BACKGROUND

A fluid spraying system may be used by an operator to deliver a fluid from a fluid source to an application area. For example, paint may be sprayed, or otherwise applied, by an applicator, such as a spray gun, to an application area, such as a surface of a wall. In order to deliver the different fluids from the fluid source to the application area, a conveyance system, such as a pump, can be used to convey the fluid from the fluid source, under pressure, through a fluid passageway and out of an outlet of the applicator to be applied to the application area.

The discussion above is merely provided for general background information and is not intended to be used as an aid in determining the scope of the claimed subject matter. The claimed subject matter is not limited to implementations that solve any or all disadvantages noted in the background.

SUMMARY

A handheld fluid spraying system includes a pump assembly configured to provide a pressurized liquid and a handheld fluid sprayer. The handheld fluid sprayer comprises a fluid inlet configured to receive the pressurized liquid, a spray tip having an outlet through which the pressurized liquid exits the handheld fluid sprayer to be applied to a surface, a trigger configured to control flow of the liquid through the handheld fluid sprayer, and a sensor configured to detect the liquid and to generate sensor data indicative thereof, the sensor being selected from the group consisting of an infrared (IR) sensor, a thermal imager, and a UV sensor. The handheld fluid spraying system further comprises a controller configured to determine a characteristic of the liquid based on the sensor data and to generate a control output based on the determined characteristic.

DETAILED DESCRIPTION OF THE DRAWINGS

For the sake of illustration, but not by limitation, aspects of the present disclosure relate to liquid applicators. While examples below are illustrated in the context of paint, it is noted that the present features can also be applicable to systems that apply other types of liquids as well. Additionally, while examples below are illustrated in the context of spray pumps, it is noted that the present features can also be applicable to paint brushes, rollers, etc.

Many fluid delivery systems employ spray pumps that are designed to pressurize a fluid, such as paint, to spray a coating of the fluid onto a desired surface. Typically, spray pumps pressurize the fluid and an applicator, such as a spray tip, sprays the fluid onto the surface at varying spray angles which determine the area of the surface that gets applied with fluid. In operation, it is difficult to determine the spray edges and spray coverage of the applied fluid apart from visual observation, such as visual observation by an operator. This becomes increasingly difficult as more fluid is applied, especially in cases where the surface and fluid have the same or similar features (e.g., color, finish). Further, spray pumps often are used in the application of other types of fluids onto surfaces of interest. For example, disinfectants are often coated onto surfaces in order to neutralize possible contaminants. Due to the transparent appearance of these disinfectants, it is difficult to observe the spray edges and/or spray coverage by eyesight or camera view alone. Therefore, it is desired to have a system that allows a user or operator to determine spray characteristics, such as spray edges (e.g., locations of spray edges) and the spray coverage, of a liquid applied by the fluid delivery system to provide, for example, a desired coating of liquid onto the surface.

Figure 1:
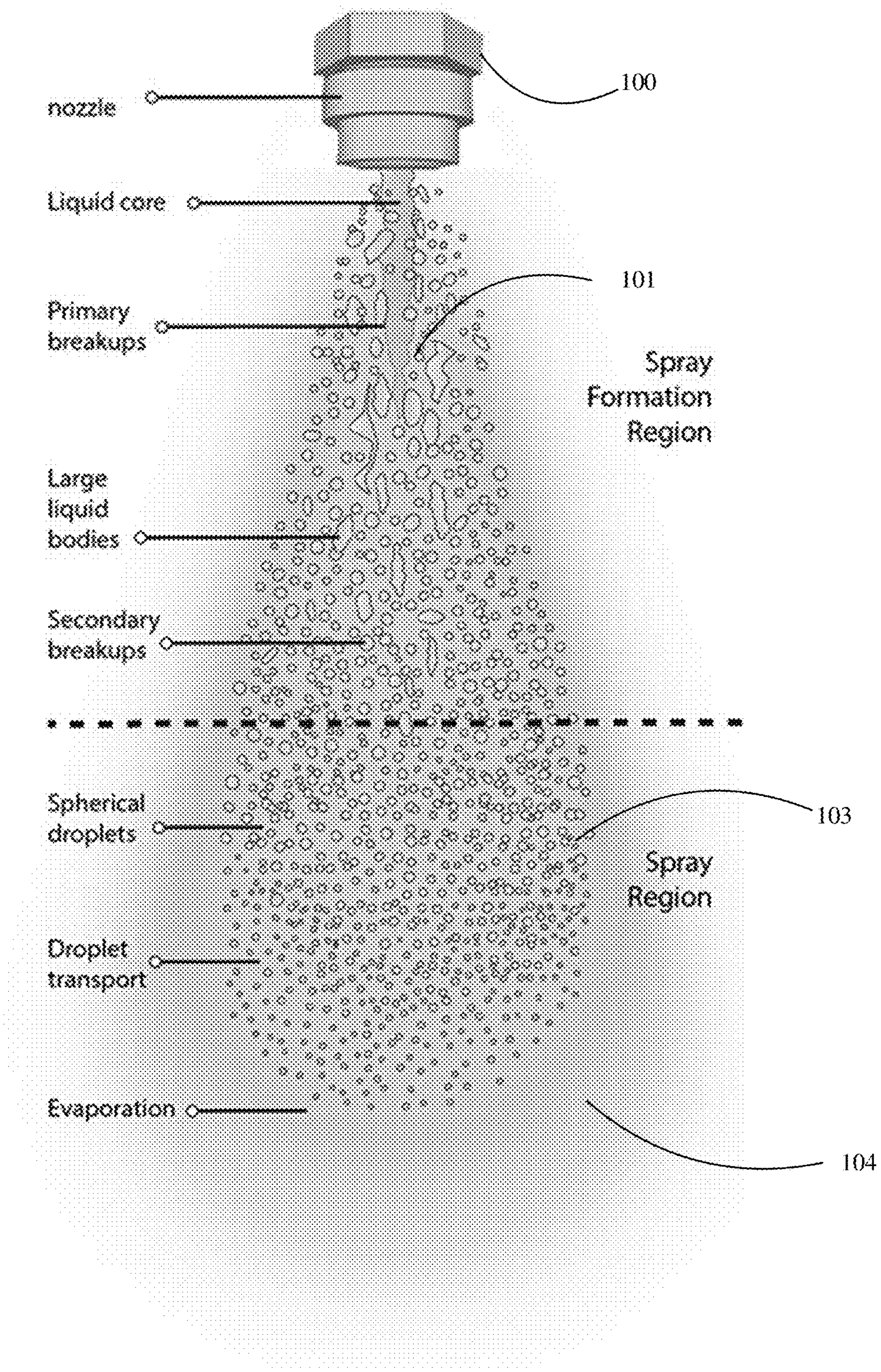
FIG. 1 is a diagrammatic view showing one example of a liquid being ejected from a spray nozzle.

FIG. 1 is a diagrammatic view showing one example of a liquid being ejected from a nozzle. As illustrated in FIG. 1, a spray tip 100 produces liquid spray 101 generally towards a surface of interest. In one example, the liquid ejected from spray tip 100 is paint. As shown at reference numeral 103, particles of the liquid dissipate in response to environmental conditions as the liquid travels through the atmosphere at a particular spray angle to the surface to be coated. As this atomization occurs, the surface area of the spray increases 104 and evaporation occurs, which results in the spray temperature dropping to a lower level than its surroundings, such as a lower level than the temperature of the surface to which the fluid has been applied. The decrease in temperature of spray 101 can be detected, for example, by a sensor capable of detecting changes in temperature at a site of interest. For example, an infrared radiation (IR) based sensor may be implemented in order to detect the varying temperatures of a surface, and thus determine spray characteristics, such as the spray edges (e.g., locations of spray edges) and/or coverage of the applied liquid.

Figure 2:
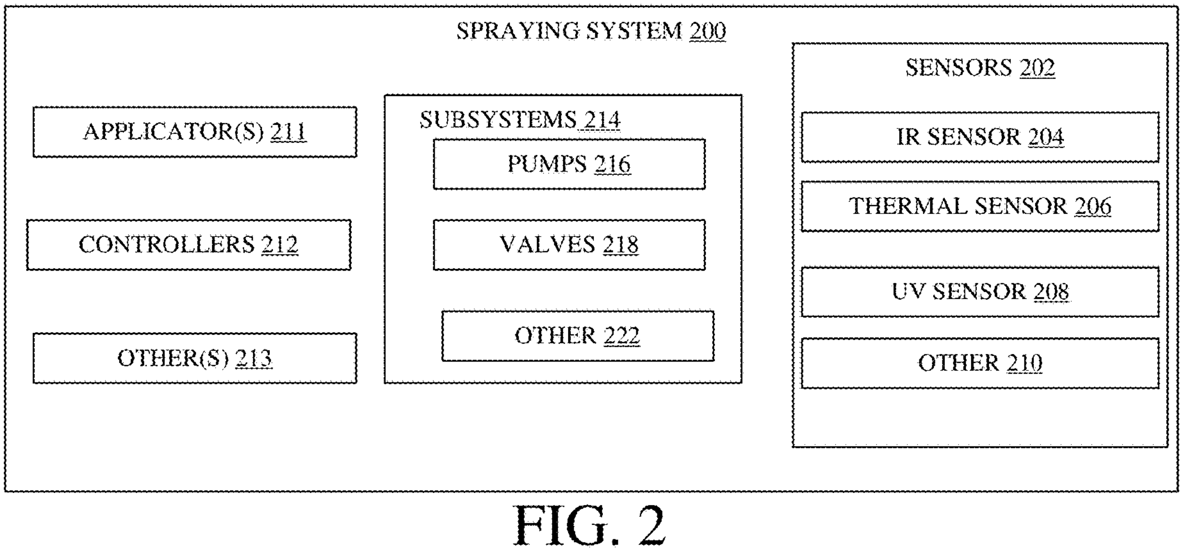
FIG. 2 is a block diagram of an example sensor-based spraying system.

FIG. 2 is a schematic block diagram of an example sensor-based spraying system. As illustrated in FIG. 2, Spraying system 200 includes sensors 202, which are configured to generate sensor data and responsively provide spray characteristics. Spray characteristics may include, for example, a spray angle and spray edges (e.g., location of spray edges) of the liquid emitted. Sensors 202 may include, for example, an IR sensor 204, a thermal sensor 206, and/or an ultraviolet (UV) sensor 208. While one type of sensor may be utilized in spraying system 200, it is also expressly contemplated that multiple types of sensors may be used.

Additionally, as indicated by block 210, other types of sensors may be implemented as well.

Spraying system 200 illustratively includes one or more controllers 212 configured to control subsystems 214. Subsystems 214 may include, for example, one or more pumps 216, one or more valves 218, etc. Additionally, subsystems 214 may include other types of subsystems as well, such as various actuators (some examples of which are described elsewhere herein) as indicated by block 222. Controller 212 is configured to identify characteristics based on the spray characteristics detected by sensors 202. For example, controller 212 may receive information by sensors 202 relating to liquid application, spray edges (e.g., locations of spray edges), spray density (e.g., thickness), spray angles, etc. In operation, controller 212 identifies characteristics of the spray produced by system 200 based on sensors 202 and responsively generates an output. The output may be, for example, an indication to an operator to move closer or further from the surface. In another example, the output may be providing an indication of the spray edges (e.g., locations of spray edges) of the liquid to the operator. Alternatively, the output may be a signal provided to controllers 212 to adjust controllable subsystems 214 based on the spray characteristics detected by sensors 202. In one example, controller 212 is or includes a microprocessor.

Additionally, spraying system 200 may include one or more applicators, such as a sprayer (e.g., a spray tip, a spray gun having a spray tip, etc.) some examples of which are provided herein. Spraying system 200 can include various other items as well, as indicated by block 213.

In one embodiment, prior to the operation of spraying system 200, environmental characteristic data indicative of environmental conditions can be utilized as a calibrating factor. For example, in the case where fluid application occurs outdoors, environmental characteristic data may be acquired pertaining to, for example, temperature, wind, humidity, etc. In one embodiment, spraying system 200 may comprise an ambient temperature sensor (not shown—but may be part of other sensors 210). However, in other embodiments, other temperature sensors may be utilized as well. For example, a temperature sensor could be placed externally in the environment to gather environmental characteristic data and could wirelessly communicate the characteristic data to system 200. In another embodiment, a user interface (UI) included in system 200 (not shown) could include a temperature sensor for obtaining the environmental characteristic data.

Figure 3:
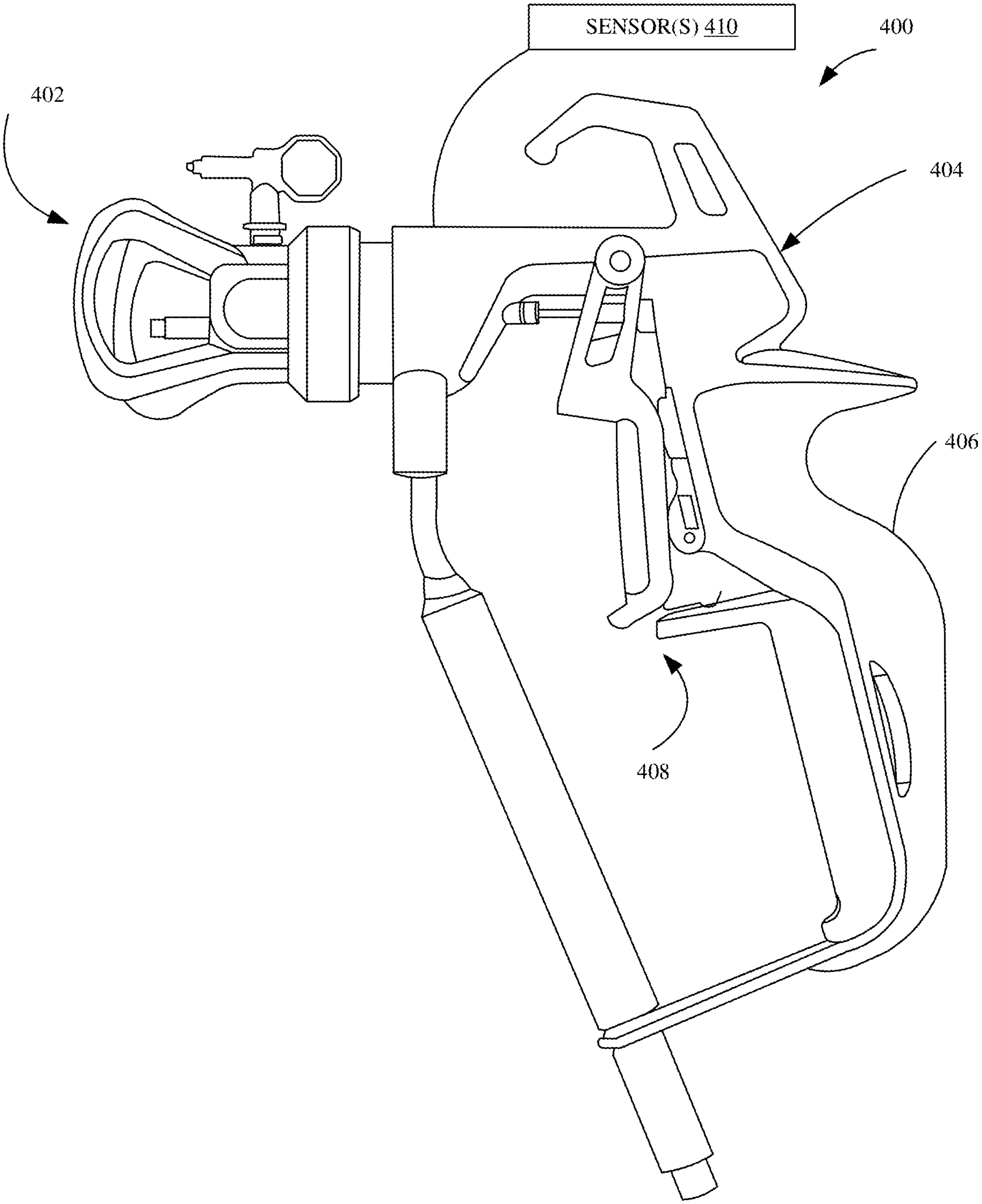
FIG. 3 is a diagrammatic view of one example of a sensor-based fluid sprayer.

FIG. 3 is a diagrammatic view of one example of a sensor-based fluid sprayer. Fluid sprayer 400 is configured to spray liquid, such as, but not limited to, paint. Sprayer 400 is configured to receive a flow of pressurized fluid (e.g., from a pump) and includes a spray orifice 402 configured to emit the liquid in a desired liquid direction and pattern. As illustrated, sprayer 400 has body 404 which illustratively includes handle 406. A trigger assembly 408 is pivotably attached to body 404 and is configured to control the flow of fluid from orifice 402. Additionally, as illustrated in FIG. 3, body 404 includes at least one or more sensors, as indicated by block 410. The one or more sensors 410 may be placed anywhere on body 404 suitable to obtain sensor data of the spray characteristics of the liquid on a surface, as described above. The sensor(s) 410 may include, for example, an IR sensor, which is configured to obtain sensor data based on a difference in temperature between the fluid spray and the surface of interest. Additionally, in other embodiments, a thermal sensor, UV sensor, or other sensor may be utilized as well. In one embodiment a sensor guard may be provided with sensor(s) 410 such that it covers and protects sensor(s) 410 from overspray ejected from orifice 402, while still allowing sensor(s) 410 to obtain sensor data. The sensor guard may be, for example, a shutter, shield, or other type of guard suitable for protecting sensor(s) 410. The sensor guard may be formed from a plastic material. However, other types of material may be used as well, such as glass, aluminum, etc.

Figure 4:
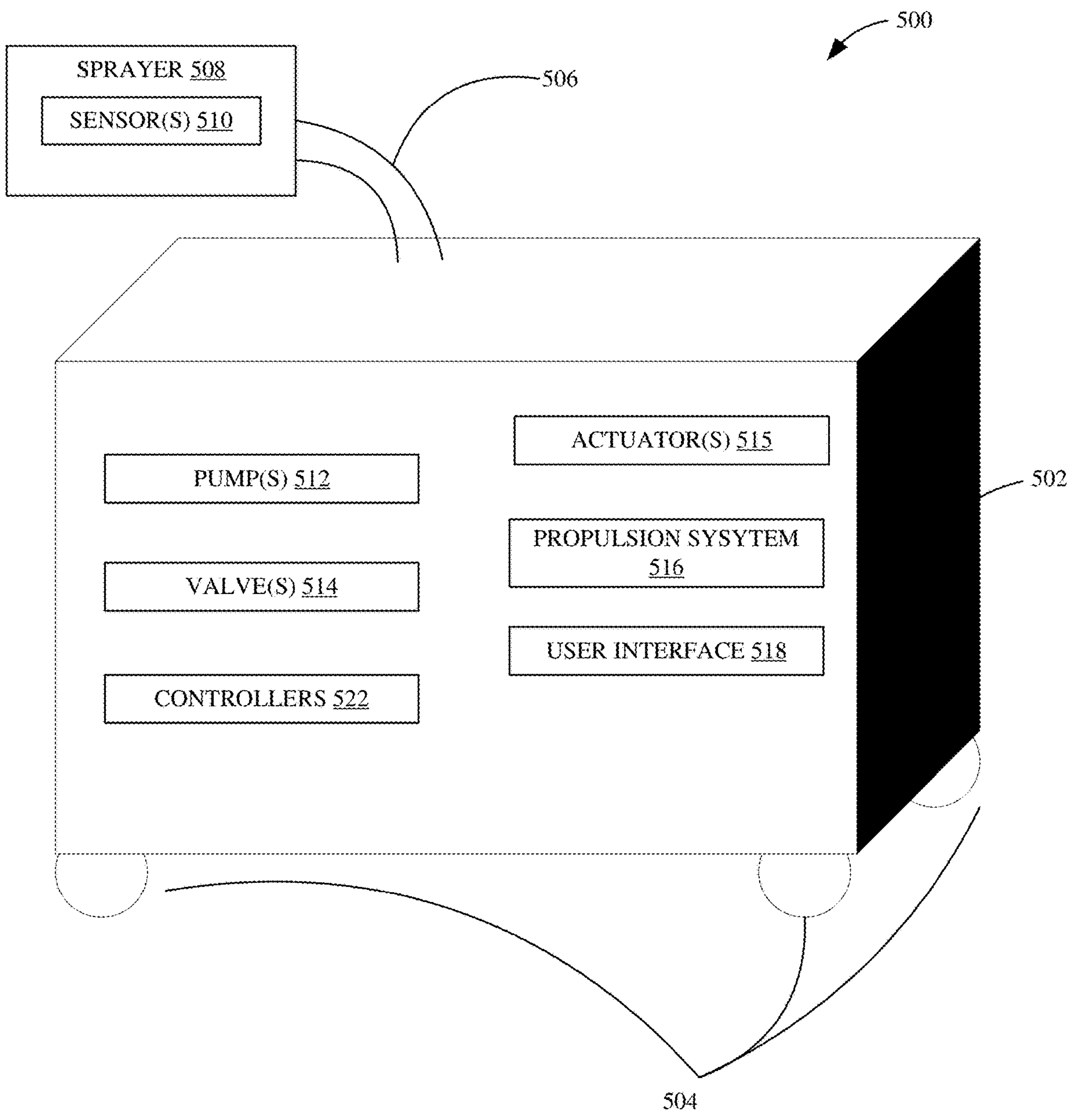
FIG. 4 is a diagrammatic view of one example of a sensor-based robotic sprayer.

FIG. 4 is a diagrammatic view of one example of a sensor-based robotic sprayer. Robotic sprayer 500 illustratively includes cart 502 configured to house various components of robotic sprayer 500. Additionally, sprayer 500 includes one or more wheels 504 coupled to cart 502, which are configured to rotate to provide movement to robotic sprayer 500. Also coupled to cart 502 is arm 506, which is configured to support sprayer 508. Robotic arm 506 may be disposed at any necessary length to support sprayer 508 and spray a particular target of interest. As indicated by FIG. 4, sprayer 508 illustratively includes one or more sensors 510. As described above, the one or more sensors may be, for example, an IR sensor. However, it is expressly contemplated that other sensors may be utilized as well (e.g., UV and/or thermal). Robotic sprayer 500 also includes pump 512 and one or more valves 514 configured to allow fluid flow therethrough. Additionally, robotic system 500 includes propulsion system 516, which may include one or more actuators configured to drive movement of wheels 504 in order to propel system 500 in a desired direction. Robotic system 500 also illustratively includes user interface 518, configured to allow operator input to initiate and/or modify the operation of the system. Further, robotic system 500 includes one or more actuators 515 configured to drive movement of robotic arm 506 and thus movement of sprayer 508.

During operation, sensor 510 gathers sensor data at the spray site, which is received and processed by controller 522 to identify spray characteristics based on the received sensor data. Spray characteristics may include, for example, a determination of the spray edges (e.g., locations of spray edges). Additionally, the identified characteristics may include spray angle, spray density (e.g., spray thickness), spray coverage, etc. Upon identification of the characteristics of interest, a control signal may be sent by controller 522 to control operation of system 500. For example, the control signal may include an indication to change location, in which controller 522 causes propulsion system 516 to rotate wheels 504 or cause actuator(s) 515 to drive movement of robotic arm 506 and sprayer 508, or both. Additionally, the control signal may include, in one example, a signal provided to the other controllable subsystems to adjust their operation. For example, a control signal may be sent to pump(s) 512 or valve(s) 514, or both, to alter their operation. Additionally, it is expressly contemplated that other control signals may be sent by controllers 522 as well. In one embodiment, the control signal may include controlling subsequent passes of sprayer 500 based on detected spray edges. For example, the control signal may indicate to sprayer 500 to, in a subsequent pass, overlap the spray edges of a previous pass, with an additional spray to ensure adequate fluid coverage on the surface. In operation, various conditions may impact the straightness of the spray edges. For example, wind conditions may result in the spray edge not being in a uniform line. Additionally, the spray tip may be blocked, resulting in an irregular spray edge. Thus, by detecting the spray edges (e.g., detecting the locations of spray edges), sprayer 500 can undergo subsequent passes and achieve the necessary overlap to ensure a proper fluid coat is applied. For example, it may be desired to overlap 50% (or half) of a previous pass with a subsequent pass. In this way, each portion of the surface gets double coated. Other desired overlap parameters (e.g., other percentage overlaps) are contemplated herein.

Figure 5:
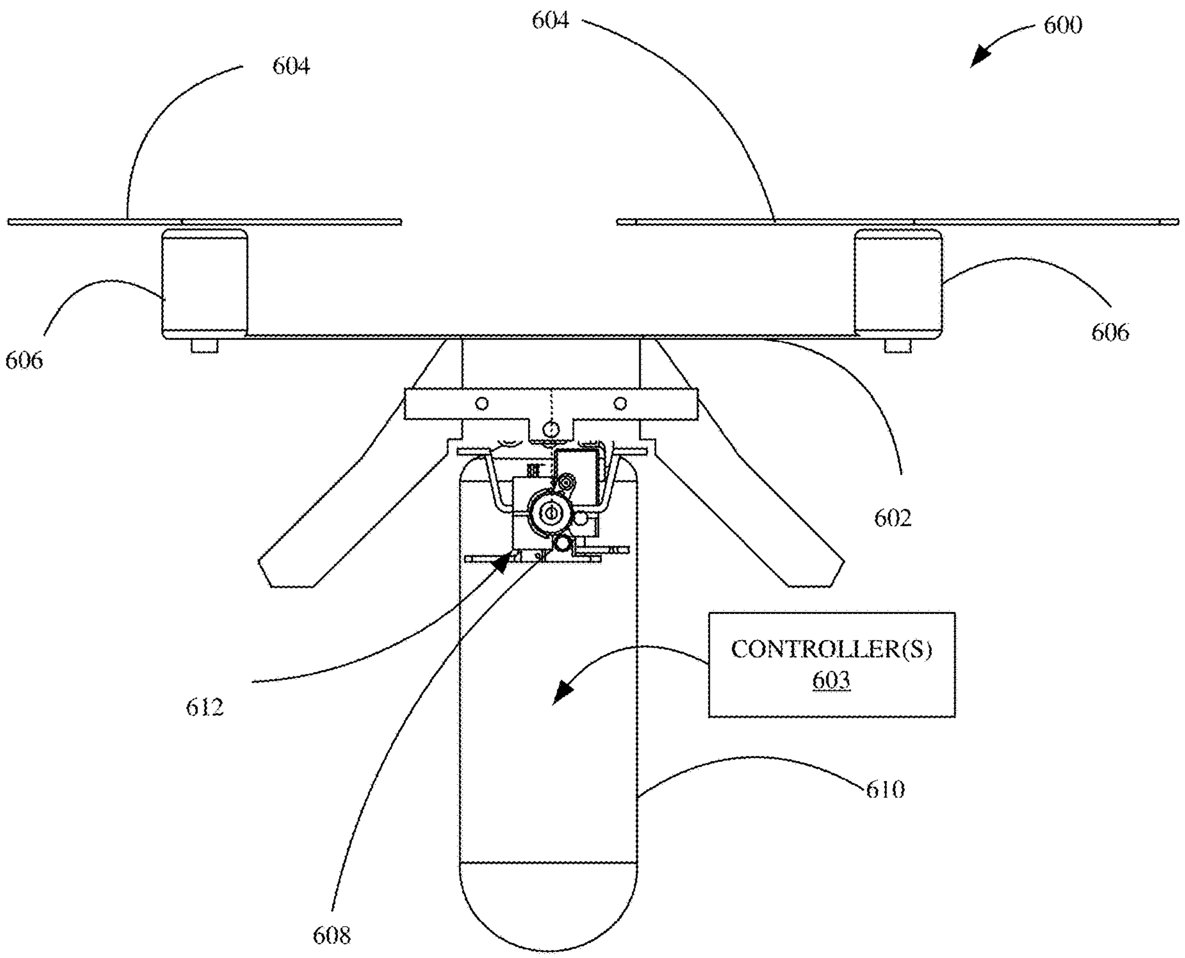
FIG. 5 is a diagrammatic view of one example of a sensor-based mobile sprayer.

FIG. 5 is a diagrammatic view of one example of a sensor-based mobile sprayer. As shown, sprayer 600 comprises, in one example, an unmanned aerial vehicle (UAV) or aerial drone. Sprayer 600 includes one or more controllers 603. Sprayer 600 further includes a body 602 that couples to rotors 604 via actuators, such as motors 606. Each rotor spins as varying speeds and directions as is known to counter rotation forces exerted by the other spinning rotors. Sprayer 600 also includes fluid applicator assembly 608 that applies a fluid (e.g., paint) to a target surface (e.g., a wall). The fluid applied by fluid applicator assembly 608 is stored adjacent to a fluid reservoir 610 that is coupled to body 602.

Figure 6:
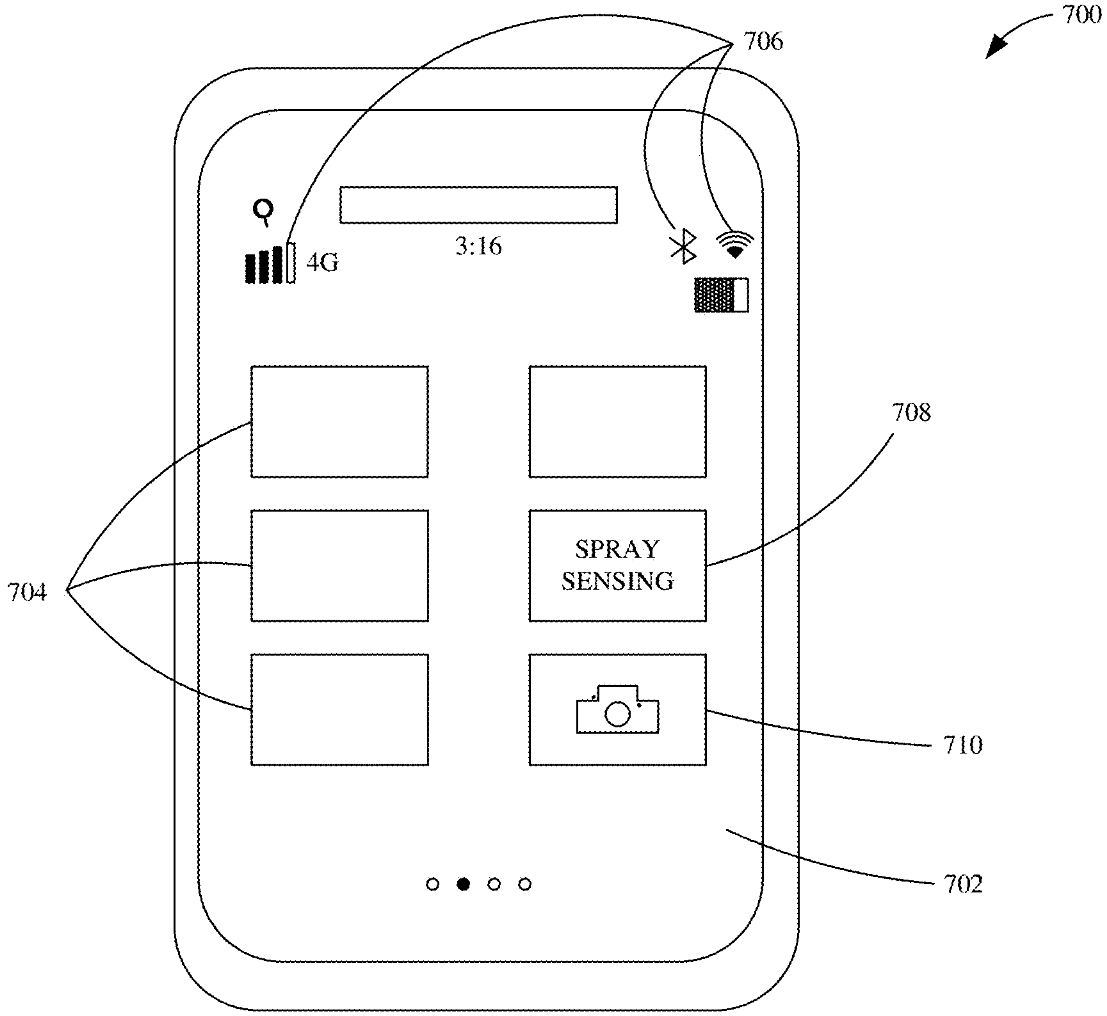
FIG. 6 is a perspective view of one example of a computing device.

As illustrated in FIG. 6, sprayer 600 further includes one or more sensors 612. Sensors 612 may be placed adjacent to fluid applicator assembly 608 or may be placed at a different location on body 602 suitable for obtaining sensor data. In one embodiment, sensor 612 is an IR sensor. However, in other embodiments, a UV or thermal sensor may be utilized as well. In operation, sensors 612 detect spray characteristics of the fluid sprayed by fluid applicator assembly 608. Spray characteristics may include, for example, data relating to spray edges (e.g., locations of spray edges), in which sensors 612 detect a difference in temperature between the applied liquid and the surface to which the liquid is applied, the temperature difference being indicative of spray edges (e.g., locations of spray edges). Additionally, other characteristics may be detected as well, such as spray angle, spray density (e.g., spray thickness), etc. The spray characteristics data detected by sensors 612 are responsively obtained by controllers 603 (which may comprise one or more processors) to identify spray characteristics of the spray site based on the received sensor data. Upon identification of the characteristics of interest, controller 603 may generate control signal (s) to control operation of sprayer 600. For example, the control signal(s) may include an indication to change location, in which controllers 603 cause motors 606 to rotate rotors 604 in varying directions to modify the position of sprayer 600. The change in position may include, for example, a change in height, distance from the surface of interest, etc. In another example, the control signal(s) may control motors 606 to rotate rotors 604 in varying ways to control the position and movement of sprayer 600 in a subsequent pass to desirably overlap a previous pass.

FIG. 6 is a diagrammatic view of one example of a computing device 700. Device 700 includes display 702, illustratively shown as an interactive touchscreen display, and can include icons, tiles or other user input mechanisms 704. Mechanisms 704 can be used by a user (e.g., via user input [e.g., touch]) to perform various functions with device 700, for example, but not limited to, running applications. Device 700 can have various connections 706 to various networks and/or devices, including, but not limited to, cellular, Bluetooth, WiFi, etc. In one example, device 700 can include one or more user input mechanisms 704 configured to cause device 700 to perform various functions relative to spray characteristic sensing (e.g., determining spray edges (e.g., locations of spray edges), etc.), as well as other functions relative to the spraying system.

In one example, spray sensing application 708 can interact with an imaging sensor (e.g., camera) on device 700, as represented by input mechanism 710. Input mechanism 710 may comprise, for example, a camera application that allows a user to access and control a camera associated with device 700. The camera may be, for example, an IR camera. However, in other embodiments, a thermal or UV camera may be utilized as well. A user, using the spray sensing application 708, can, in one example, scan and/or capture an image of a surface of interest (e.g., a wall) on which a liquid spray has been recently applied. Application 708 can, based on the scan and/or captured image, detect spray characteristics via the camera and identify the spray characteristics (e.g., via controller(s), etc.). The spray characteristics may include, for example, an indication of spray edges (e.g., locations of spray edges). In another example, the spray characteristics may include an indication of the spray angle, spray coverage, spray density (e.g., spray thickness), etc. Spray sensing application 708 can include and/or display various display elements and/or user input mechanisms. For example, application 708 can include user input mechanisms that allow a user to view spray edges on the surface in real time (or near real time), and/or provide recommendations to the user based on the identified spray characteristics. In another example, spray coverage, spray density (e.g., spray thickness), spray angle, etc. may be viewed. The recommendations may include, for example a suggestion to move location, provide an additional spray coating, etc.

Additionally, in other embodiments, sensing application 708 can interact with imaging sensor 700 to detect fluid edges of a liquid applied on a surface in operations other than spraying. For example, device 700 may detect the edges of a fluid applied by, for example, a paint roller. In another example, device 700 may detect the edges of a fluid applied by a brush.

Figure 7A:
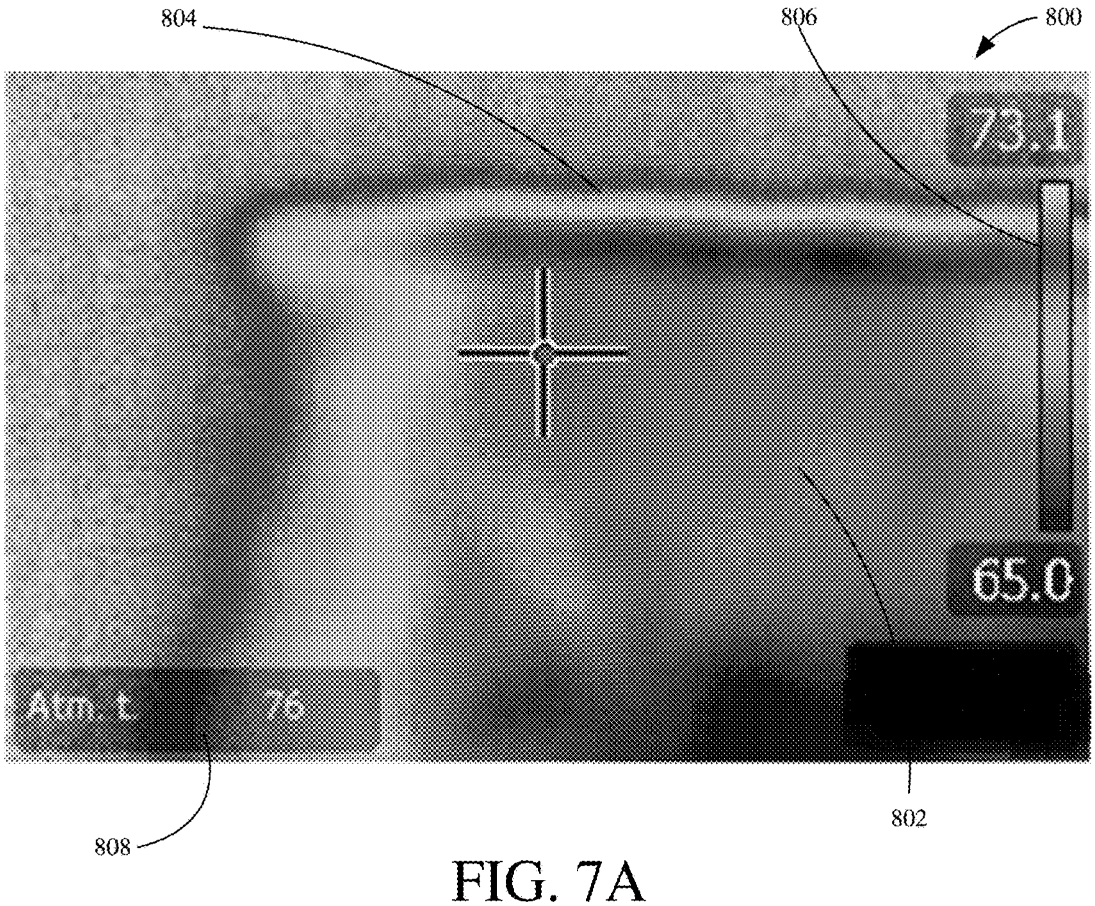
FIGS. 7A-7B are diagrammatic views of one example of an image obtained by a sensor-based fluid sprayer.
Figure 7B:
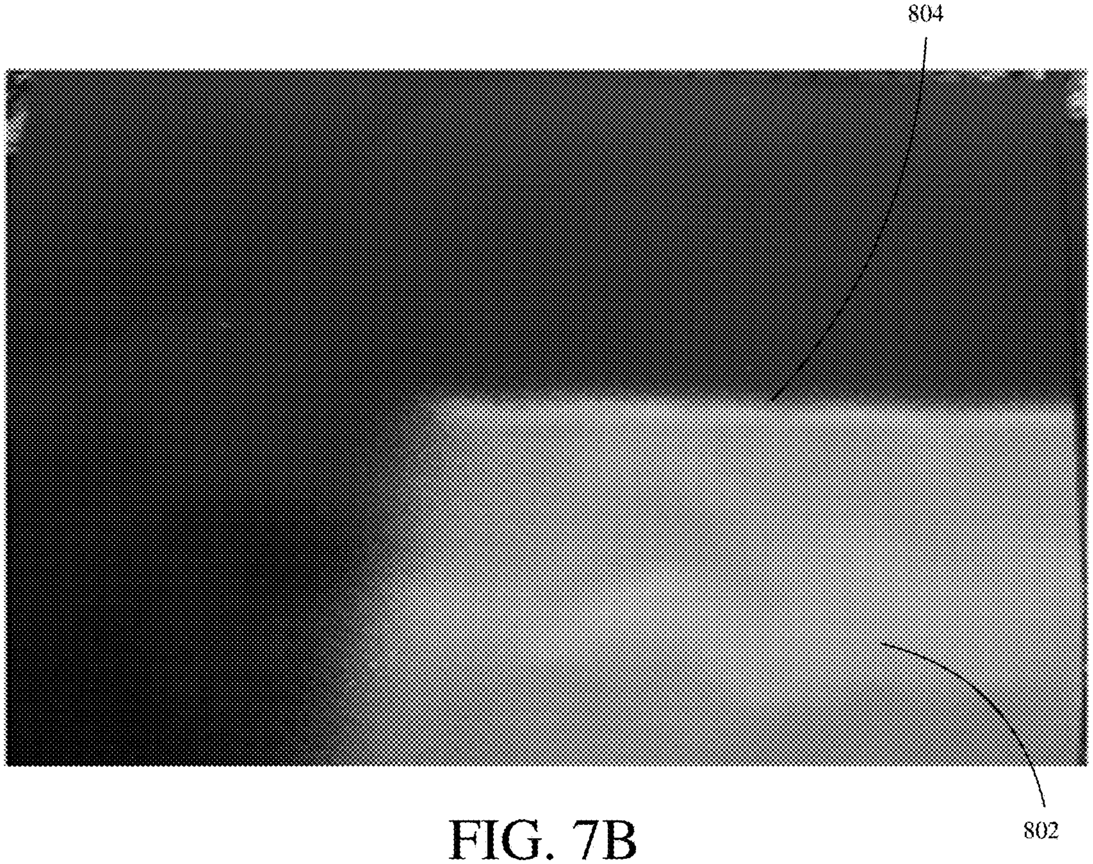
Figure 8A:
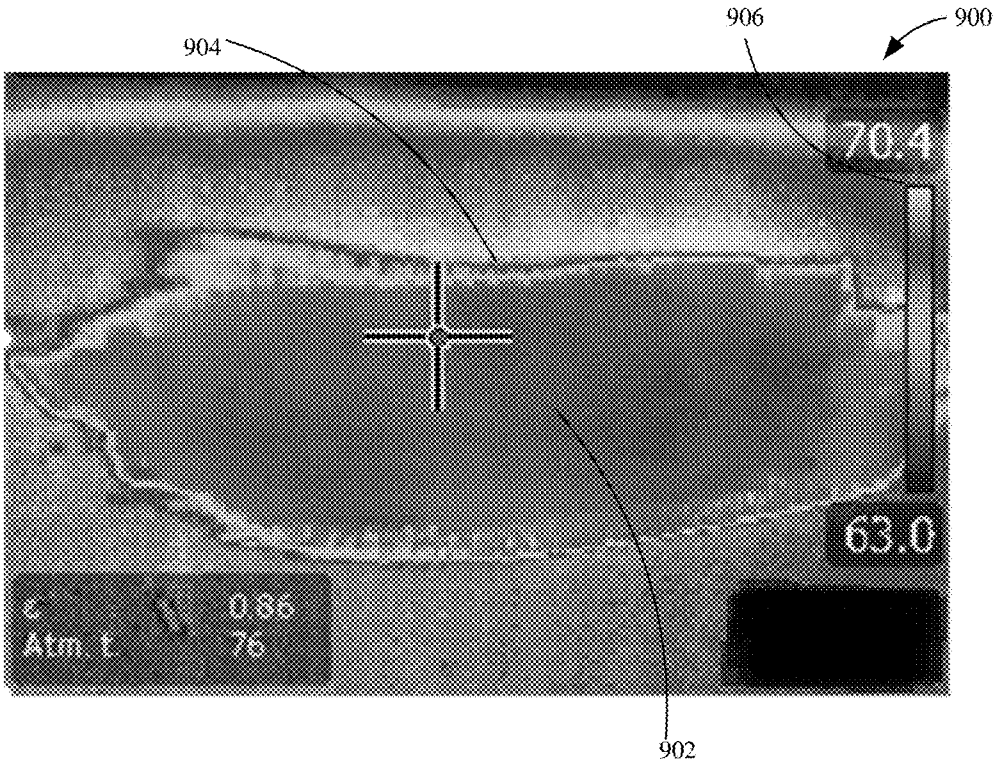
FIGS. 8A-8B are diagrammatic views of one example of an image obtained by a sensor-based system.

FIGS. 7A-7B are diagrammatic views of one example of an image obtained by a sensor-based fluid sprayer. FIG. 7B bears some similarities to FIG. 7A, and like components are labeled accordingly. Image 800 may be produced by, for example, the one or more sensors described above with respect to FIGS. 2-6. As illustrated, image 800 shows fluid application 802 applied on a surface of interest. FIG. 7B is an image from an eye view perspective, and FIG. 8A is an IR image. However, it is expressly contemplated that other images may be obtained as well, such as UV and/or thermal images. As shown, fluid application 802 has a lower temperature than the surface of interest, which is shown as a different color in image 800. Additionally, as shown in image 800, fluid application 802 has fluid edges 804, which are observable via the temperature difference observed in image 800. Image 800 also includes key 806, which indicates the relative temperature corresponding to the colors observed in the image. Additionally, image 800 includes an atmospheric temperature indication, as indicated by reference numeral 808.

In one example operation, a user may use a sensor-based fluid sprayer to spray a surface of interest and additionally receive characteristics relative to the applied area detected by the one or more sensors described above. For example, as shown in image 800, spray characteristics may be obtained by the one or more sensors to indicate the edge of the fluid applied onto the surface. Additionally, information relating to fluid coverage, fluid density (e.g., fluid thickness), and fluid angle may also be obtained via the information collected from image 800.

Figure 8B:
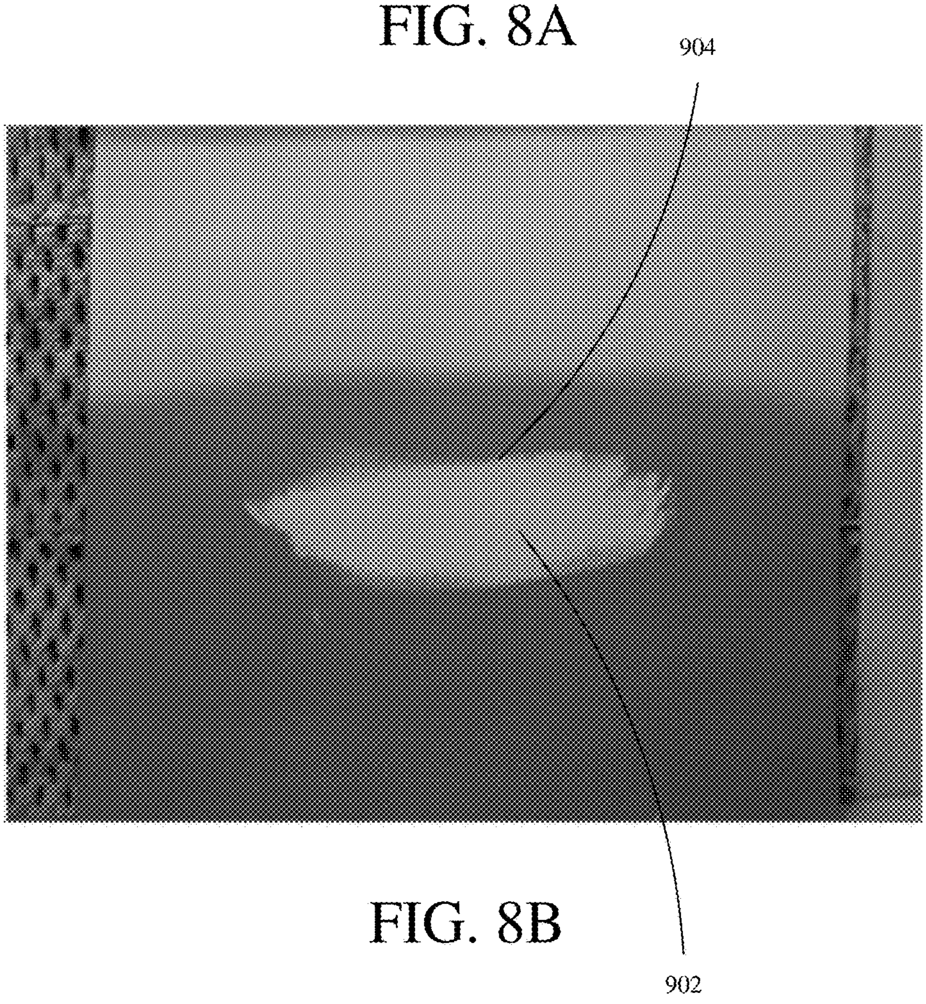

FIGS. 8A-8B are diagrammatic views of one example of an image obtained by a sensor-based system. FIG. 8B bears some similarities to FIG. 8A, and like components are labeled accordingly. Image 900 may be produced by, for example, the one or more sensors described above. As illustrated, image 900 shows fluid application 902 applied on a surface of interest. Fluid application 902 may be applied by, for example, a fluid roller, such as a paint roller. However, in other examples, a fluid brush, such as a paint brush, or other application tool may be utilized. As shown, FIG. 9B is an image from an eye view perspective, and FIG. 9A is an IR image. However, it is expressly contemplated that other images may be obtained as well, such as UV and/or thermal images. As shown, fluid application 902 has a lower temperature than the surface of interest, which is shown as a different color in image 900. Additionally, as shown in image 900, fluid application 902 has paint edges 904, which are observable via the temperature difference observed in image 900. Image 900 also includes key 906, which indicates the relative temperature corresponding to the colors observed in the image.

In operation, the sensor may obtain data relative to the area applied with fluid by the roller and/or brush. In this way, fluid edges, coverage (e.g., area of coverage), density (e.g., thickness), etc. may be identified, indicative of fluid rolled and/or brushed on the surface. For example, the sensor may be disposed within a mobile device, wherein a user operates the mobile device to obtain a sensor image after applying fluid onto the surface. Additionally, it is expressly contemplated that other modes of fluid sensing may be utilized as well.

Figure 9:
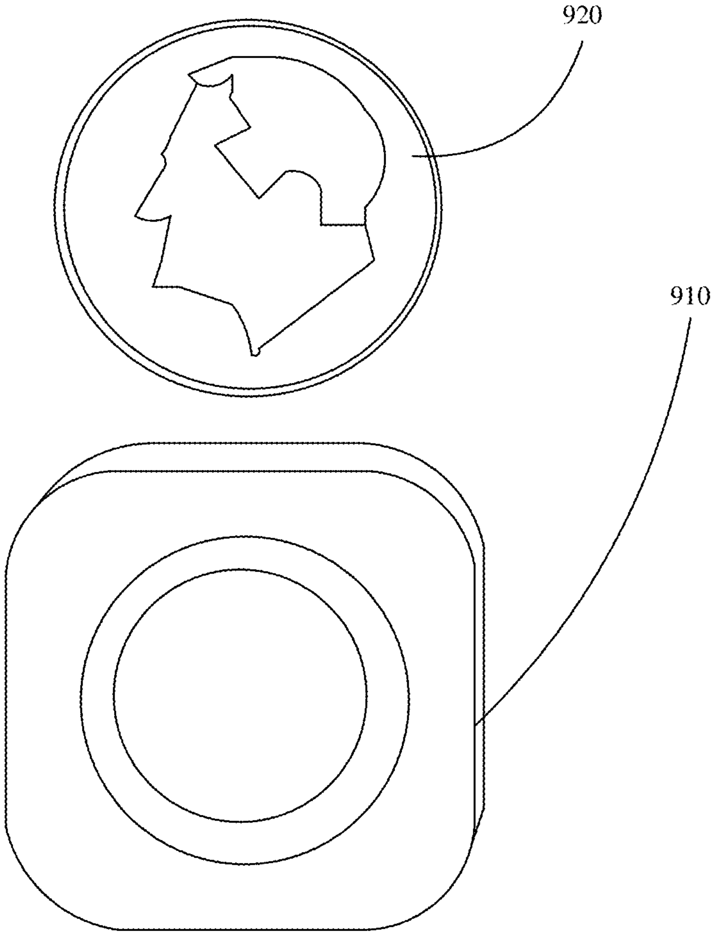
FIG. 9 is a diagrammatic view of one example of a sensor.
Figure 10:
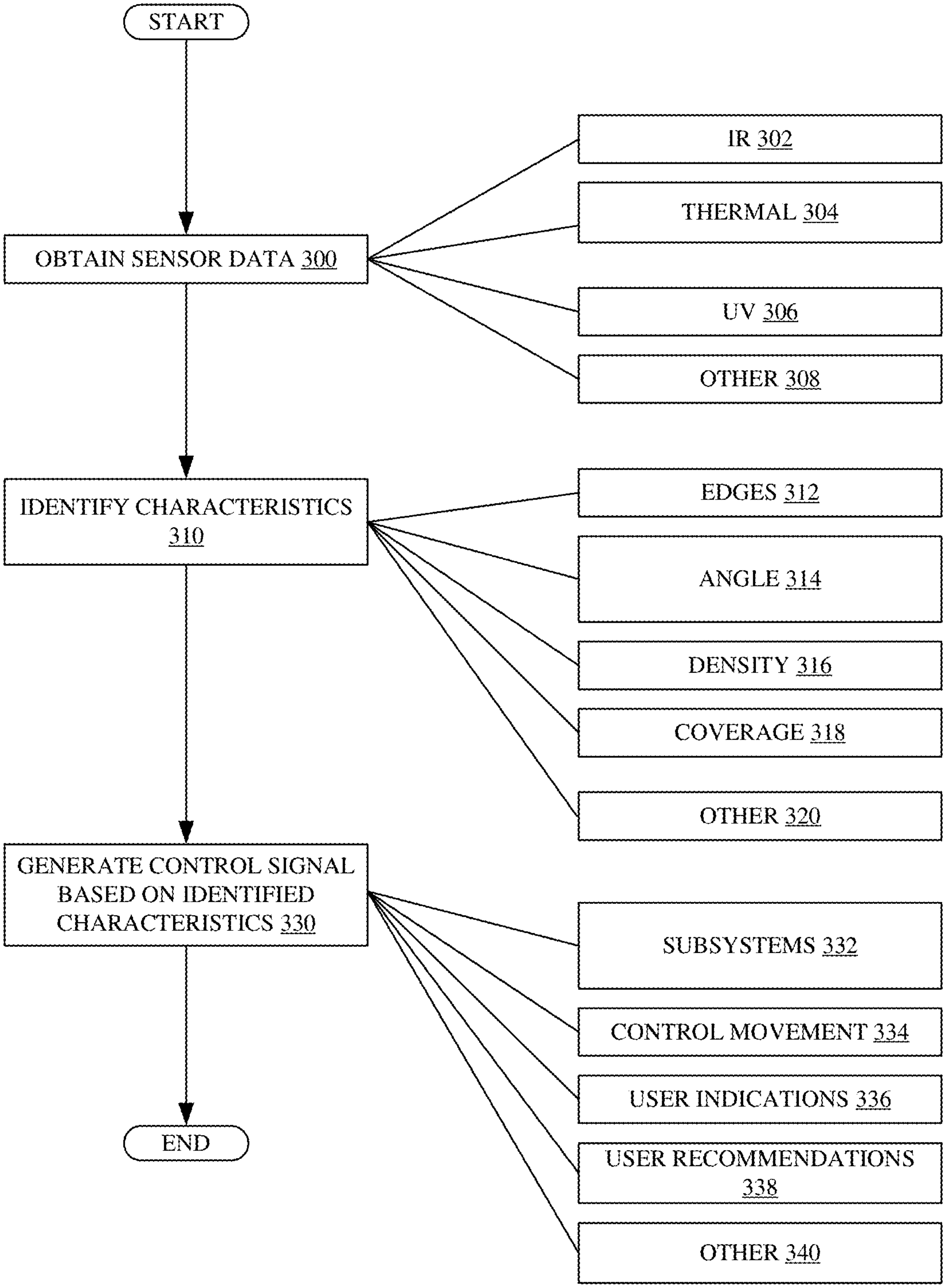
FIG. 10 is a flow diagram showing an example operation of the spraying system.

FIG. 9 is a diagrammatic view of one example of a sensor. As illustrated in FIG. 10, sensor 910 is of a size such that it may be disposed in any embodiment discussed above with respect to FIGS. 2-6. For example, sensor 910 may be around 8×11×9 mm. In other embodiments, the size may be around 10×20×21 mm. Additionally, the sensor may be sized such that it may be disposed in a mobile computing device, such as a smart phone, tablet, etc. However, it is expressly contemplated that sensors of other sizes may be utilized as well. Further, coin 920 is shown for a general size reference. Coin 920, as illustrated in FIG. 9, is a United States dime (ten-cent coin). In operation, sensor 910 may be disposed in the embodiments discussed above to obtain sensor data relative to a surface of interest. In one embodiment, sensor 910 is an IR sensor. However, in other embodiments, sensor 910 may be a thermal or UV sensor.

FIG. 10 is a flow diagram showing an example operation of a spraying system. The operation begins at block 300 when spraying has begun onto a target of interest and sensor data is obtained indicative of characteristics, such as spray characteristics. Sensor data is obtained by one or more sensors within the spraying system. The sensor data may include, for example, IR data 302 produced by an IR sensor or thermal data 304 produced by a thermal sensor, or both. Additionally, or alternatively, sensor data may include UV data 306 provided by a UV sensor within the spraying system or may include other types of sensor data as well, as indicated by block 308.

The operation proceeds at block 310 where one or more characteristics of the fluid are identified based on the sensor data. Characteristics of the fluid (e.g., spray characteristics) may include, for example, a determination of the edges 312 (e.g., spray edges (e.g., locations of spray edges)). For example, in the case where an IR sensor is utilized, the edges (e.g., locations of edges) may be identified based on a temperature difference in the sensor data between the applied (e.g., sprayed) fluid and the surface of interest. Additionally, or alternatively, the identified characteristics may include one or more of application (e.g., spray) angle 314, application (e.g., spray) density 316 (or application (e.g., spray) thickness), or application (e.g., spray) coverage 318. Further, it is expressly contemplated that other characteristics of the fluid may be identified as well, as indicated by block 320.

The operation proceeds at block 330 where one or more control signals are generated based on the identified characteristics. The control signal(s) may include, in one example, a signal provided to one or more subsystems 332 to adjust their operation. For example, a control signal may be sent to a pump of the spraying system to alter its operation. Additionally, the control signal may include controlling movement of the spraying system, as indicated by block 334. This example is particularly useful in cases where the spraying system utilizes robotic (or autonomous or semi-autonomous) operation. Further, the control signal may include providing an indication to a user, as indicated by block 336. The indication may be, for example, a display of the identified characteristics of the spray. Additionally, the control signals may include user recommendations 338, indicating to a user or operator how to adjust operation in order to improve spray characteristics. For example, the control signal may be a recommendation to the operator to move closer to or further from the surface. In another example, the control signal may include a recommendation to the operator to change the spray tip. Additionally, the generated control signals may include some other type of signal as well, as indicated by block 340. In one embodiment, the control signal may include controlling subsequent passes of the sprayer based on detected spray edges (e.g., locations of spray edges). For example, the control signal may control the position or movement, or both, of the sprayer to control the overlap of a previous pass with a subsequent pass.

At least some examples are described herein in the context of applying a coating material, such as paint, to a surface. As used herein, paint includes substances composed of coloring matter or pigment suspending in a liquid medium as well as substances that are free of coloring matter or pigment. Paint can also include preparatory coatings, such as primers. Paint can be applied to coat a surface as a liquid or a gaseous suspension, for example, and the coating provided can be opaque, transparent, or semi-transparent. Some particular examples include, but are not limited to, latex paint, oil-based paint, stain, lacquers, varnish, inks, and the like. At least some examples can be applied in plural components systems.

Additionally, while a particular order of steps has been described for the sake of illustration, it is to be understood that some or all of these steps can be performed in any number of orders.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts mentioned above are disclosed as example forms of implementing the claims.

What is claimed is:

1. An automated fluid spraying system comprising:

a sprayer configured to apply a fluid to a surface during a first pass;

a sensor configured to detect the fluid on the surface and to generate sensor data indicative of the fluid on the surface, the sensor being selected from the group consisting of an infrared (IR) sensor, a thermal imager, and a UV sensor; and a controller configured to:

determine, based on the sensor data, a location of a first pass spray edge of the fluid on the surface applied during the first pass;

define a position of a second pass on the surface, adjacent the first pass, based on the determined location of the first pass spray edge; and control movement of the sprayer relative to the surface based on the defined position of the second pass.

2. The automated fluid spraying system of claim 1, wherein the controller is configured to control an actuator to drive the movement of the sprayer relative to the surface based on the defined position of the second pass.

3. The automated fluid spraying system of claim 1, wherein the controller is configured to control the movement of the sprayer during the second pass to control overlap of fluid applied during the second pass over fluid on the surface applied during the first pass.

4. The automated fluid spraying system of claim 1 wherein the sprayer is coupled to end of a robotic arm, and the controller is configured to control an actuator to control movement of the robotic arm during the second pass to control overlap of fluid applied during the second pass over fluid on the surface applied during the first pass.

5. The automated fluid spraying system of claim 1 wherein the controller is configured to control a rotor to control the movement of the sprayer during the second pass to control overlap of fluid applied during the second pass over fluid on the surface applied during the first pass.

6. The automated fluid spraying system of claim 1, wherein the sensor comprises one of an IR sensor or a thermal imager;

wherein the controller is further configured to identify a temperature difference between the fluid applied to the surface during the first pass and a portion of the surface around the fluid applied to the surface during the first pass; and wherein the controller determines the location of the first pass spray edge based on the identified temperature difference between the fluid applied to the surface during the first pass and the portion of the surface around the fluid applied to the surface during the first pass.

7. The automated fluid spraying system of claim 1 and further comprising an ambient temperature sensor configured to detect an ambient temperature and generate sensor data indicative of the detected ambient temperature; and wherein the controller determines the location of the first pass spray edge based further on the sensor data indicative of the detected ambient temperature.

8. The automated fluid spraying system of claim 1, wherein the controller is configured to:

determine, based on the sensor data, a first characteristic of a first area of the surface;

determine, based on the sensor data, a second characteristic of a second area of the surface; and determine the location of the first pass spray edge based on one or more differences between the first characteristic and the second characteristic.

9. An automated fluid spraying system comprising:

a sprayer configured to apply a fluid to a surface during a first pass;

a sensor configured to detect the fluid on the surface and to generate sensor data indicative of the fluid on the surface, the sensor being selected from the group consisting of an infrared (IR) sensor, a thermal imager, and a UV sensor; and a controller including at least one processor and memory storing instructions executable by the at least one processor, wherein the instructions, when executed, cause the controller to:

determine, based on the sensor data, a location of a first pass spray edge of the fluid on the surface applied during the first pass;

define a position of a second pass on the surface, adjacent the first pass, based on the determined location of the first pass spray edge; and control movement of the sprayer relative to the surface based on the defined position of the second pass.

10. The automated fluid spraying system of claim 9, wherein the instructions, when executed, cause the controller to an actuator to drive the movement of the sprayer relative to the surface based on the defined position of the second pass.

11. The automated fluid spraying system of claim 9, wherein the instructions, when executed, cause the controller to control the movement of the sprayer during the second pass to control overlap of fluid applied during the second pass over fluid on the surface applied during the first pass.

12. The automated fluid spraying system of claim 9, wherein the sprayer is coupled to end of a robotic arm, and the instructions, when executed, cause the controller to control an actuator to control movement of the robotic arm during the second pass to control overlap of fluid applied during the second pass over fluid on the surface applied during the first pass.

13. The automated fluid spraying system of claim 9, wherein the instructions, when executed, cause the controller to control a rotor to control the movement of the sprayer during the second pass to control overlap of fluid applied during the second pass over fluid on the surface applied during the first pass.

14. The automated fluid spraying system of claim 9, wherein the sensor comprises one of an IR sensor or a thermal imager; and the instructions, when executed, cause the controller to:

identify a temperature difference between the fluid applied to the surface during the first pass and a portion of the surface around the fluid applied to the surface during the first pass; and determine the location of the first pass spray edge based on the identified temperature difference between the fluid applied to the surface during the first pass and the portion of the surface around the fluid applied to the surface during the first pass.

15. The automated fluid spraying system of claim 9 and further comprising an ambient temperature sensor configured to detect an ambient temperature and generate sensor data indicative of the detected ambient temperature; and wherein the instructions, when executed, cause the controller to determine the location of the first pass spray edge based further on the sensor data indicative of the detected ambient temperature.

16. A computer implemented method of controlling an automated fluid spraying system, the computer implemented method comprising:

controlling a sprayer, of the automated fluid spraying system, to apply fluid to a surface during a first pass;

receiving sensor data generated by a sensor that detects the fluid on the surface, the sensor being selected from the group consisting of an infrared (IR) sensor, a thermal imager, and a UV sensor;

determining, based on the sensor data, a location of a first pass spray edge of the fluid on the surface applied during the first pass;

defining a position of a second pass on the surface, adjacent the first pass, based on the determined location of the first pass spray edge; and controlling movement of the sprayer relative to the surface based on the defined position of the second pass.

17. The computer implemented method of claim 16, wherein controlling movement of the sprayer comprises controlling an actuator to drive the movement of the sprayer relative to the surface based on the defined position of the second pass.

18. The computer implemented method of claim 16, wherein controlling movement of the sprayer comprises controlling movement of the sprayer during the second pass to control overlap of fluid applied during the second pass over fluid on the surface applied during the first pass.

19. The computer implemented method of claim 16, wherein the sprayer is coupled to end of a robotic arm, and controlling movement of the sprayer comprises controlling movement of the robotic arm during the second pass to control overlap of fluid applied during the second pass over fluid on the surface applied during the first pass.

20. The computer implemented method of claim 16, wherein controlling movement of the sprayer comprises controlling a rotor to control the movement of the sprayer during the second pass to control overlap of fluid applied during the second pass over fluid on the surface applied during the first pass.

* * * * *